United States Patent
Weston

(10) Patent No.: US 9,650,019 B2
(45) Date of Patent: May 16, 2017

(54) VEHICLE CAR WASH MODE

(71) Applicant: Ford Global Technologies, LLC, Dearborn, MI (US)

(72) Inventor: Keith Weston, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 66 days.

(21) Appl. No.: 14/629,546

(22) Filed: Feb. 24, 2015

(65) Prior Publication Data
US 2016/0244029 A1    Aug. 25, 2016

(51) Int. Cl.
   B08B 7/04     (2006.01)
   B60S 3/00     (2006.01)
   B60S 3/04     (2006.01)
   B60T 7/12     (2006.01)
   B60T 13/66    (2006.01)
   B60S 1/08     (2006.01)

(52) U.S. Cl.
   CPC ........... *B60S 3/004* (2013.01); *B60S 3/04* (2013.01); *B60T 7/12* (2013.01); *B60T 13/662* (2013.01); *B60S 1/08* (2013.01); *B60T 2201/08* (2013.01); *B60T 2270/413* (2013.01)

(58) Field of Classification Search
None
See application file for complete search history.

(56) References Cited

U.S. PATENT DOCUMENTS

| | | | |
|---|---|---|---|
| 8,583,330 B2 | 11/2013 | Furness et al. | |
| 8,682,548 B2 | 3/2014 | Park | |
| 2011/0155192 A1 | 6/2011 | Ahmad et al. | |
| 2013/0079998 A1* | 3/2013 | Furness | B60S 3/00 701/49 |
| 2014/0052312 A1* | 2/2014 | Stadler | B60S 3/04 701/2 |

FOREIGN PATENT DOCUMENTS

| | | |
|---|---|---|
| JP | 201036676 A | 2/2010 |
| KR | 20040041935 | 5/2004 |

OTHER PUBLICATIONS

Neff, Can your car get through the wash?, Oct. 27, 2014, Autoweek, p. 1-8.*
Subaru, Subaru Owner's Manual, 2014, Subaru, Forward, p. 24.*

* cited by examiner

*Primary Examiner* — Binh X Tran
*Assistant Examiner* — David Cathey, Jr.
(74) *Attorney, Agent, or Firm* — Frank A. MacKenzie; Bejin Bieneman PLC

(57) ABSTRACT

A vehicle system includes a processing device programmed to receive a first user input signal and activate a car wash mode in response to receiving the first user input signal. Activating the car wash mode includes temporarily disabling at least one vehicle safety system. A method includes receiving the first user input signal, activating a vehicle car wash mode in response to receiving the first user input signal, receiving a second user input signal, and deactivating the car wash mode in response to receiving the second user input signal.

13 Claims, 3 Drawing Sheets

VEHICLE CAR WASH MODE

BACKGROUND

Automatic car washes sometimes include a conveyer that directs a vehicle through multiple stations. Soap, water, and wax can be applied as the vehicle travels through the car wash. Brushes can be used to scrub debris from the vehicle body. After the vehicle has been washed and rinsed, excess water may be blown off with an air dryer or wiped off with a curtain or a towel.

DETAILED DESCRIPTION

Many car wash facilities were designed to accommodate vehicles that lack certain modern features. For example, some car was facilities require that the occupants exit the vehicle. However, some vehicles do not permit the vehicle to roll while in neutral and without someone in the driver seat. Also, some vehicles will automatically lock the doors when the vehicle begins to move. If the keys are left inside an unoccupied vehicle moving through a car wash, the vehicle could inadvertently lock out the occupants. Finally, certain vehicle safety systems, such as an active braking system, a lane keeping system, and a collision avoidance system, could inadvertently be triggered while in the car wash facility, which could damage the vehicle or the facility itself.

One way to allow a vehicle with modern features to use a car wash facility includes a vehicle system that can execute a car wash mode. Specifically, the vehicle system includes a processing device programmed to activate the car wash mode in response to receiving a first user input signal indicating that the vehicle is about to enter a car wash. Activating the car wash may include, among other things, temporarily disabling at least one vehicle safety system, limiting a maximum vehicle speed to a predetermined value, activating at least one external vehicle light, unlocking at least one vehicle door and keeping the at least one vehicle door unlocked at least while the car wash mode remains activated, disabling an automatic wiper system, turning off a vehicle engine while in a neutral transmission state, and at least temporarily setting a parking brake. The car wash mode may be disabled upon receipt of a second user input signal. The second user input signal may be generated in response to a user actuating a door handle, turning a steering wheel, pressing a throttle, pressing a brake pedal, or actuating a shifter. The parking brake may be temporarily set in response to receiving the second user input signal and released in response to the processing device detecting that an occupant is present in the vehicle.

The elements shown may take many different forms and include multiple and/or alternate components and facilities. The example components illustrated are not intended to be limiting. Indeed, additional or alternative components and/or implementations may be used.

Figure 1:
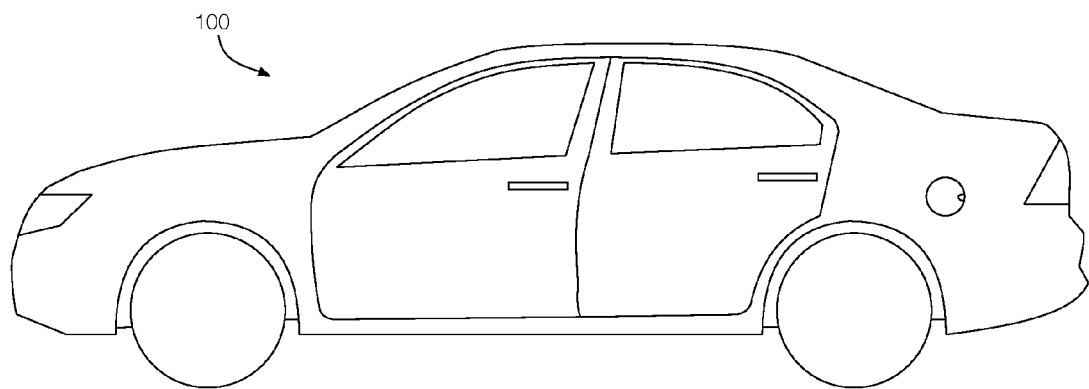
FIG. 1 illustrates an example vehicle that can operate in a car wash mode.

As illustrated in FIG. 1, the host vehicle 100 with a car wash mode. When the car wash mode is activated, certain vehicle subsystems may be temporarily disabled. For example, an active braking system, lane keeping system, and collision avoidance system may be disabled while the host vehicle 100 is in the car wash mode. Moreover, while the car wash mode is active, the host vehicle 100 may be limited to a maximum speed such as, e.g., 5 mph, certain external lights such as the headlights, hazard lights, or taillights may be turned on, the doors of the host vehicle 100 may be unlocked and remain unlocked until the car wash mode is disabled, the automatic windshield wipers may be deactivated, and the engine may be turned off even though the host vehicle 100 is in a neutral transmission state. The parking brake may be set to help one or more occupants exit and enter the vehicle before and after the car wash, respectively. The car wash mode may be deactivated in response to a user input. Example user inputs may include an occupant pressing a button in the passenger compartment to disable the car wash mode. The button may be a hard button or a virtual button. Alternatively, the car wash mode may be deactivated in response to a user input caused by, e.g., an occupant actuating a door handle, the steering wheel, the throttle, the brake pedal, the shifter, etc.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

Figure 2:
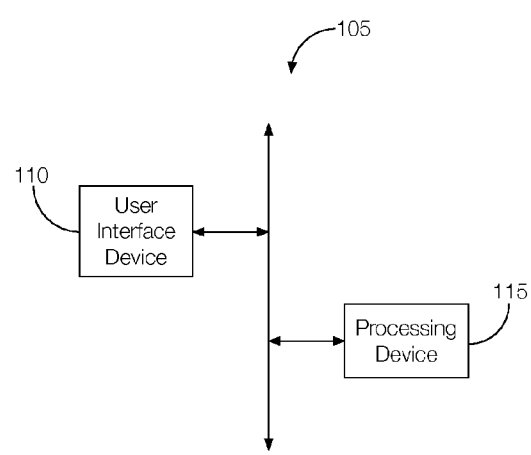
FIG. 2 is a block diagram of components of an example vehicle system that may be incorporated into the host vehicle of FIG. 1.

FIG. 2 is a block diagram of an example vehicle system 105 that may be incorporated into the host vehicle 100. The vehicle system 105 may include a user interface device 110 and a processing device 115.

The user interface device 110 may include a computing device programmed to present information to a user, such as a driver, during operation of the host vehicle 100. Moreover, the user interface device 110 may be configured or programmed to receive user inputs during operation of the host vehicle 100. In some possible approaches, the user interface device 110 may include hardwired or virtual buttons presented on, e.g., a touch-sensitive display screen. The user interface device 110 may be programmed to generate various user input signals representing, e.g., a user's desire to activate the car wash mode or deactivate the car wash mode. For example, a first user input signal may indicate the user's desire to activate the car wash mode, and a second user input signal may indicate the user's desire to deactivate the car wash mode. The first and second signals may be generated in response to a user input provided to the user interface device 110 or another device such as the door handle, steering wheel, throttle, brake pedal, shifter, etc. In some instances, the door handle, steering wheel, throttle, brake pedal, and shifter may be configured or programmed to transmit signals to the user interface device 110.

The processing device 115 may include a computing device programmed to cause the host vehicle 100 to operate in the car wash mode. For example, the processing device 115 may be programmed to receive a first user input signal from, e.g., the user interface device 110 and activate the car wash mode in response to receiving the first user input signal. To activate the car wash mode, the processing device 115 may be programmed to output a number of control signals. The control signals may be transmitted to any number of systems, including vehicle safety systems. In one possible implementation, the control signals may cause the systems to deactivate or otherwise become temporarily disabled. For instance, the control signals generated by the processing device 115 may temporarily disable an active braking system, a lane keeping system, a collision avoidance system, and an automatic wiper system.

The processing device 115 may generate other control signals in addition to or as an alterative to those that temporarily disable certain systems. For example, one control signal may limit the maximum vehicle speed to a predetermined value such as, e.g., 5 mph. This way, the host vehicle 100 can be driven through the car wash by, e.g., a car wash attendant while effectively making it difficult for the car wash attendant to drive the host vehicle 100 anywhere else. Another control signal may activate at least one external vehicle light such as a headlight, hazard light, or brake light. Turning on external lights may make the host vehicle 100 more visible, especially in an environment like a car wash where visibility may be limited. The processing device 115 may be further programmed to output a control signal to unlock the doors of the host vehicle 100 and keep the doors unlocked as long as the host vehicle 100 remains in the car wash mode. Therefore, the processing device 115 may reduce the chances that the occupants will be locked out if they exit the vehicle during the car wash.

In some instances, the host vehicle 100 will not allow an occupant to turn off the vehicle engine while the host vehicle 100 is in the neutral transmission state. Some car washes, however, require the vehicle to be in neutral. Accordingly, the processing device 115 may be programmed to output a control signal that would allow the vehicle engine to turn off, despite being in the neutral transmission state, when the host vehicle 100 is in the car wash mode. Further, if one or more occupants wishes to exit the vehicle prior to the car wash, activating the car wash mode may include the processing device 115 generating a control signal to set the parking brake, at least until each occupant has egressed from the vehicle. The processing device 115 may release the parking brake after each occupant has exited the host vehicle 100 to allow the host vehicle 100 to travel through the car wash.

The processing device 115 may be programmed to deactivate the car wash mode in response to receiving a second user input signal. The second user input signal may be generated in response to a user input provided to the user interface device 110 or in response to a user input provided to, e.g., a door handle, a steering wheel, a throttle, a brake pedal, or a shifter. Disabling the car wash mode may include activating the active braking system, the lane keeping system, the collision avoidance system, and the windshield wiper system. The processing device 115 may be further programmed to remove the maximum vehicle speed limit, turn off the external lights, allow the doors to lock, etc. Moreover, in response to receiving the second user input signal, the processing device 115 may be programmed to set the parking brake to allow the occupants to enter the host vehicle 100. The processing device 115 may be programmed to release the parking brake once an occupant is detected in, e.g., the driver seat in the passenger compartment.

Figure 3:
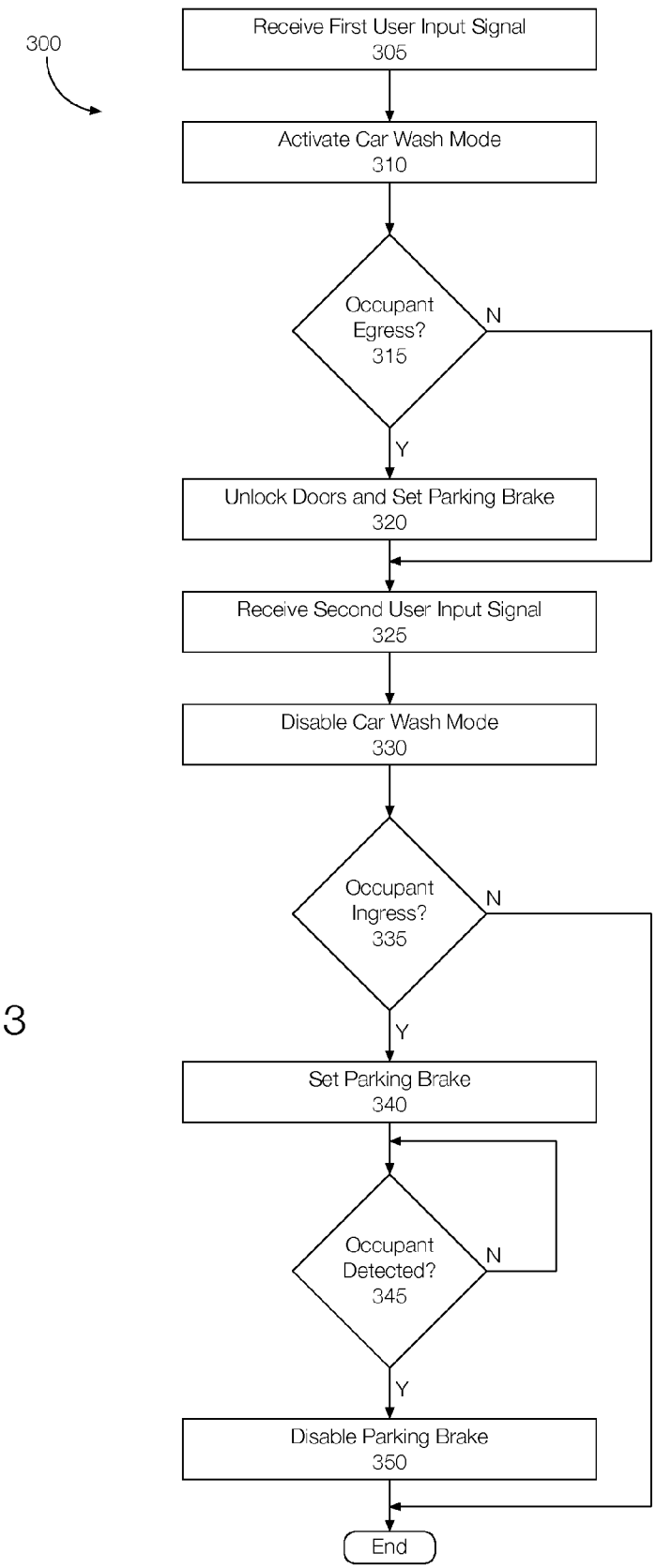
FIG. 3 is a flowchart of an example process that may be executed by a processing device for implementing the car wash mode.

FIG. 3 is a flowchart of an example process 300 that may be executed by the vehicle system 105 for implementing the car wash mode. For example, the process 300 may be executed by, e.g., the processing device 115. The process 300 may be initiated in response to a user input indicating that the user wishes for the host vehicle 100 to operate in the car wash mode. The process 300 may end after the host vehicle 100 has received the car wash and is ready to resume normal operations.

At block 305, the processing device 115 may receive the first user input signal. The first user input signal may be generated by the user interface device 110 in response to an occupant of the host vehicle 100 pressing a real or virtual button indicating the occupant's desire for the host vehicle 100 to operate in the car wash mode. The user interface device 110 may transmit the first user input signal to the processing device 115.

At block 310, the processing device 115 may activate the car wash mode. Activating the car wash mode may include outputting control signals to temporarily disable at least one vehicle system such as an active braking system, a lane keeping system, a collision avoidance system, a windshield wiper system, or the like. Moreover, activating the car wash mode may include outputting control signals to limit a maximum vehicle speed to a predetermined value, activate at least one external light of the host vehicle 100, unlock at least one door of the host vehicle 100 and keep the door unlocked while the car wash mode remains activated, allow the vehicle engine to turn off while the transmission is in a neutral state, and set the parking brake to allow the occupants to exit the vehicle.

At decision block 315, the processing device 115 may determine whether one or more occupants wish to exit the host vehicle 100. An occupant's decision to exit the host vehicle 100 may be indicated by, e.g., the occupant actuating a door handle or another user input provided to, e.g., the user interface device 110. If an occupant wishes to exit the vehicle, the process 300 may proceed to block 320. Otherwise, the process 300 may proceed to block 325.

At block 320, the processing device 115 may unlock the doors of the host vehicle 100 and set the parking brake. Setting the parking brake may allow one or more occupants to exit the host vehicle 100 without fear of the host vehicle 100 moving during egress of the occupants. The parking brake may remain set until all occupants have exited the host vehicle 100, all of the doors have been closed, or both.

At block 325, the processing device 115 may receive the second user input signal. The second user input signal may be generated in response to a user input provided to the user interface device 110 or a user input provided to, e.g., a door handle, steering wheel, throttle, brake pedal, or shifter of the host vehicle 100. The process 300 may proceed to block 330 after the second user input signal has been received.

At block 330, the processing device 115 may disable the car wash mode. Disabling the car wash mode may include activating the systems that were temporarily deactivated at block 310. For example, disabling the car wash mode may include activating the active braking system, the lane keeping system, the collision avoidance system, and the windshield wiper system. Moreover, the processing device 115 may be programmed to remove the maximum vehicle speed limit, turn off the external lights, allow the doors to lock, etc.

At decision block 335, the processing device 115 may determine whether any occupants exited the host vehicle 100 at block 315. If so, the process 300 may proceed to block 340. If none, the process 300 may end.

At block 340, the processing device 115 may output a control signal to set the parking brake. Setting the parking brake may allow the occupants to enter the vehicle without fear of the host vehicle 100 moving during ingress.

At block 345, the processing device 115 may detect one or more occupants in the passenger compartment of the host vehicle 100. In one possible approach, the processing device 115 may determine whether the number of passengers in the host vehicle 100 is the same as immediately prior to the host vehicle 100 entering the car wash mode before the process 300 proceeds to block 350.

At block 350, the processing device 115 may disable the parking brake so that the host vehicle 100 may be driven away from the car wash. The process 300 may end after block 350.

Figure 4:
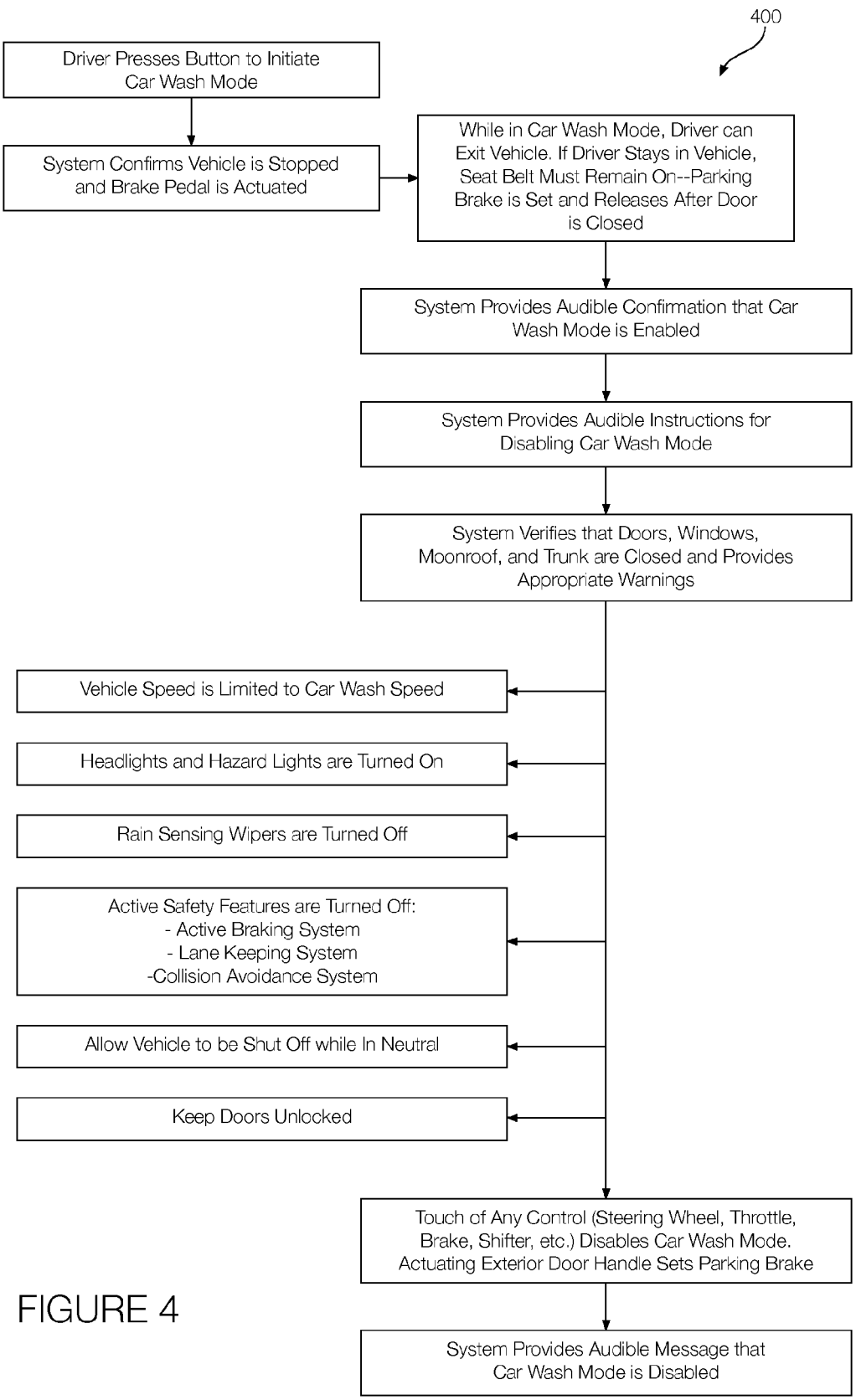
FIG. 4 is a flowchart that graphically illustrates how the vehicle may operate when in the car wash mode.

FIG. 4 is a flowchart 400 that graphically illustrates how the vehicle may operate when in the car wash mode. The car wash mode may be initiated when a passenger, such as the driver, presses a button, or provides another input, inside the host vehicle 100 indicating the passenger's desire for the host vehicle 100 to operate in the car wash mode. The input may be provided via the user interface device 110 and processed via the processing device 115. The system 105 may confirm that the host vehicle 100 is stopped and that the brake pedal is actuated (e.g., the driver is pushing on the brake pedal) before enabling the car wash mode. Once enabled, the driver and other passengers can exit the host vehicle 100 if they so desire. If any passengers stay in the host vehicle 100, the system 105 may require them to remain seated with their seat belts engaged. If any passengers wish to exit, the system 105 may set the parking brake and keep it set until, e.g., the doors are closed. When the car wash mode is enabled, the system 105 may provide an audible confirmation, along with audible instructions for disabling the car wash mode. Such instructions may include, e.g., an indication that actuating the door handle, or providing an input to, e.g., the steering wheel, throttle, etc., will cause the system 105 to disable the car wash mode and return the host vehicle 100 to normal operation. Finally, the system 105 may confirm that all doors, windows, the moonroof or sunroof, and trunk are closed before the car was mode is initiated.

When the car wash mode is initiated, the system 105 may limit the speed of the host vehicle 100 to, e.g., a maximum speed of 5 mph. The system 105 may command that some or all external lights, such as headlights, hazard lights, or both, turn on. The system 105 may turn off rain sensing wipers as well as any active safety features such as an active braking system, a lane keeping system, and a collision avoidance system. The system 105 may further allow the host vehicle 100 to be turned off while in neutral, and the system 105 may prevent the doors of the host vehicle 100 from locking so long as the car wash mode remains enabled.

As soon as a passenger, such as the driver, interacts with a particular vehicle control, such as a steering wheel, throttle, brake, shifter, etc., the system 105 may disable the car wash mode. When a passenger actuates a door handle, the system 105 may set the parking brake. Finally, the system 105 may generate an audible message notifying the occupants that the car wash mode has been disabled.

In general, the computing systems and/or devices described may employ any of a number of computer operating systems, including, but by no means limited to, versions and/or varieties of the Ford Sync® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
a processing device, incorporated into an on-board vehicle computer, programmed to receive a first user input signal and activate a car wash mode in a host vehicle in response to receiving the first user input signal,
wherein the processing device is programmed to confirm that the host vehicle is stopped, confirm that a brake pedal of the host vehicle is actuated, and output a first signal to at least one vehicle safety system to temporarily disable the at least one vehicle safety system after confirming the host vehicle stopped and the brake pedal is actuated to activate the car wash mode,
wherein the processing device is programmed to receive a second user input signal and deactivate the car wash mode in response to receiving the second user input signal by outputting a second signal to the at least one vehicle safety system.

2. The vehicle system of claim 1, wherein the vehicle safety system includes at least one of an active braking system, a lane keeping system, and a collision avoidance system.

3. The vehicle system of claim 1, wherein activating the car wash mode includes limiting a maximum vehicle speed to a predetermined value.

4. The vehicle system of claim 1, wherein activating the car wash mode includes activating at least one external vehicle light.

5. The vehicle system of claim 4, wherein the external vehicle light includes at least one of a headlight and a hazard light.

6. The vehicle system of claim 1, wherein activating the car wash mode includes unlocking at least one vehicle door and keeping the at least one vehicle door unlocked at least while the car wash mode remains activated.

7. The vehicle system of claim 1, wherein activating the car wash mode includes disabling an automatic wiper system.

8. The vehicle system of claim 1, wherein activating the car wash mode includes turning off a vehicle engine while in a neutral transmission state.

9. The vehicle system of claim 1, wherein activating the car wash mode includes at least temporarily setting a parking brake.

10. The vehicle system of claim 1, wherein second user input signal is generated in response to a user input provided to at least one of a door handle, a steering wheel, a throttle, a brake pedal, and a shifter.

11. The vehicle system of claim 1, wherein the processing device is programmed to set a parking brake in response to receiving the second user input signal.

12. The vehicle system of claim 11, wherein the processing device is programmed to detect an occupant in a passenger compartment and disable the parking brake in response to detecting the occupant in the passenger compartment.

13. A vehicle system comprising:
a processing device, incorporated into an on-board vehicle computer, programmed to receive a first user input signal and activate a car wash mode in a host vehicle in response to receiving the first user input signal,
wherein, to activate the car wash mode, the processing device is programmed to output a first signal to at least one vehicle safety system to temporarily disable the at least one vehicle safety system, wherein the processing device is further programmed to output signals to limit a maximum vehicle speed to a predetermined value, activate at least one external vehicle light, unlock at least one vehicle door and keep the at least one vehicle door unlocked at least while the car wash mode remains activated, disable an automatic wiper system, turn off a vehicle engine while in a neutral transmission state, and at least temporarily set a parking brake,
wherein the processing device is programmed to receive a second user input signal and deactivate the car wash mode by outputting a second signal to the at least one vehicle safety system and wherein the processing device is further programmed to temporarily set the parking brake in response to receiving the second user input signal at least until an occupant is detected in a passenger compartment.

* * * * *